Figure 1:
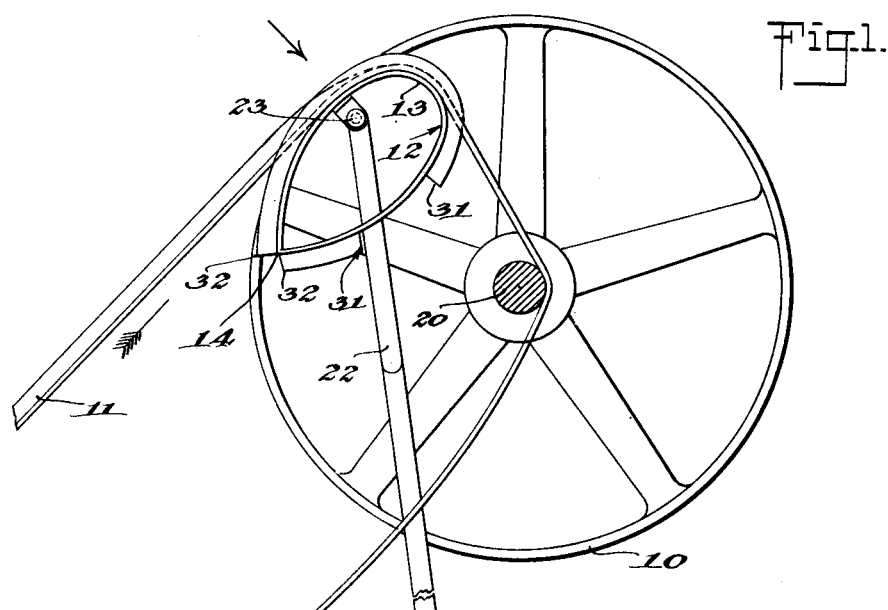

April 22, 1930.    F. L. HOMSTEAD ET AL    1,755,876
BELT REPLACER
Filed April 20, 1928

WITNESS
William P. Goebel

INVENTORS
F. L. Homstead
W. R. Homstead

ATTORNEY

Patented Apr. 22, 1930

1,755,876

UNITED STATES PATENT OFFICE

FRANK L. HOMSTEAD AND WILSON R. HOMSTEAD, OF PITTSFIELD, MAINE

BELT REPLACER

Application filed April 20, 1928. Serial No. 271,593.

This invention relates to belt replacers.

An object of the invention is the provision of a device which is light in construction whereby the same may be readily handled by a single operator for replacing a belt on a pulley and which is constructed in such a manner that the replacer may be operated from an advantageous position that the operator will not be endangered by the usual revolving shafts and pulleys.

A further object of the invention is the provision of a device for replacing belts without necessitating the stoppage of the machinery, in which a rockable member of elliptical shape is mounted on a rod pivotally supporting the member which when manually elevated to the proper position will urge the belt upon a pulley.

A still further object of the invention is the provision of a belt replacer rockably mounted on a rod or handle and having a pair of sections of elliptical form and receding in width from an enlarged to a pointed end to carry and apply the belt to a pulley, the oscillation of the replacer aiding in forcing an exposed and free portion of the belt in frictional contact with the rim of the pulley.

This invention will be best understood from a consideration of the following detailed description; nevertheless it is to be understood that the invention is not confined to the disclosure, being susceptible of such changes and modifications which shall define no material departure from the salient features of the invention as expressed in the appended claims.

Figure 2:
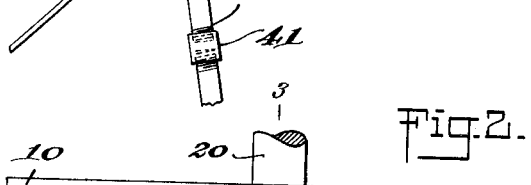
Figure 3:
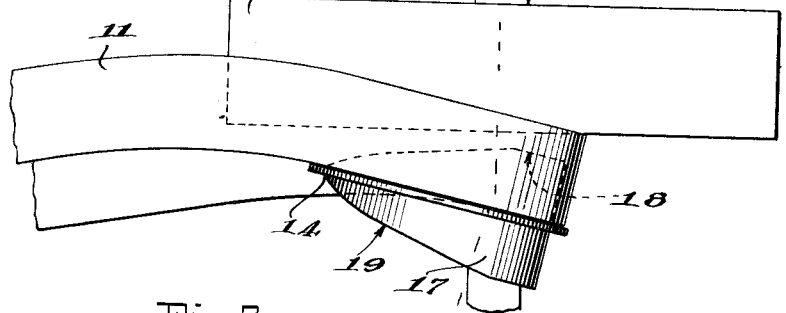
Figure 4:
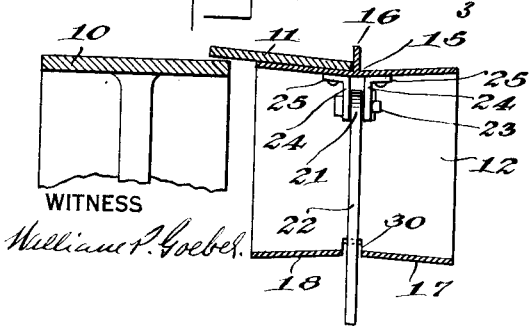

In the drawings:

Figure 1 is a view in side elevation of a pulley showing our belt replacer in an operative position, Figure 2 is a plan view of the same, Figure 3 is a transverse vertical section taken along the line 3—3 of Figure 2, and Figure 4 is a vertical section of the enlarged end of the belt replacer.

Referring more particularly to the drawings 10 designates a pulley on which is trained a belt 11. The pulley is driven by a shaft 20, and is preferably shown as the overhead type.

The belt replacer forming the subject of the present invention consists of an endless member or band 12 in the form of a distorted ellipse in which one end 13 is rounded while the opposite end 14 is pointed. The central portion 15 is of less diameter than the outer peripheries and the construction is provided for by causing the band to be progressively inclined inwardly from its opposite edges.

A flange 16 is secured to the band at the reduced central portion 15 and divides the band into two similar sections 17 and 18. Each section is widest at the rounded portion 13 of the band and tapers in an invariable manner as shown at 19 towards the pointed end 14.

One end 21 of a rod 22 is pivotally mounted on a bolt 23 between a pair of ears 24 which supports the bolt. The ears have flanges 25 which are riveted or welted to the inner face of the band and opposite a slot 30 cut in the band. The slot is located in line with the indented central portion or depression 15.

The flange as shown at 31 is cut away to provide for the oscillation of the rod 22 when the band is operated for replacing a belt on the pulley 10. The free ends of the flange terminate at 32 upon opposite sides of the pointed end 14.

The outer end of the handle 22 is threaded at 40 to receive a sleeve 41. An extension 42 is threaded into the sleeve 41 when it is found that the handle 22 has not sufficient length to apply the belt 11 to the pulley because of the height of the pulley from the floor.

The operation of our device is as follows:—

The slipped belt is placed upon one of the sections 17 or 18 of the replacer. The section employed of course depends upon the side of the pulley at which the belt is to be applied. The rod 22 is elevated until the belt may be engaged with the rim of the pulley. The replacer is moved in the direction of rotation of the pulley while the inclined edge 19 of a section 17 or 18 of the replacer provides for a free portion of the belt for frictional contact with the rim of the pulley whereby the belt will be rapidly trained over the pulley.

In employing the replacer, the large or rounded end of the same is pointed towards the direction of rotation of the pulley while the sharp end 14 is opposed to the direction of rotation.

The oscillation of the replacer has the effect of urging the belt to its position on the pulley, particularly when the end 14 moves upwardly.

We claim:

1. A belt replacer comprising an endless band, a rod pivotally connected to the band, a flange located intermediate the edges of the band and dividing the band into two sections, each section decreasing in width from one portion of the band to the opposite portion, the band being in the shape of a distorted ellipse.

2. A belt replacer comprising an endless band, a rod pivotally connected to the band, a flange located intermediate the edges of the band and dividing the band into two sections, each section decreasing in width from one portion of the band to the opposite portion, the replacer being elongated and having one end pointed.

3. A belt replacer comprising an endless band, a rod pivotally connected to the band, a flange located intermediate the edges of the band and dividing the band into two sections, each section decreasing in width from one portion of the band to the opposite portion, said band having a slot through which projects the rod, the flange being broken away for the length of the slot.

4. A belt replacer comprising an endless band, a rod pivotally connected to the band, a flange located intermediate the edges of the band and dividing the band into two sections, each section decreasing in width from one portion of the band to the opposite portion, said band having a slot through which projects the rod, the rod being pivoted to the inner face of the band.

5. A belt replacer comprising an endless band, a rod pivotally connected to the band, a flange located intermediate the edges of the band and dividing the band into two sections, the band having its greatest width at one portion of the replacer and invariably decreasing in width to the opposite portion where the band terminates in a point.

6. A belt replacer comprising an endless band, a rod pivotally connected to the band, a flange located intermediate the edges of the band and dividing the band into two sections, the band having its greatest width at one portion of the replacer and invariably decreasing in width to the opposite portion where the band terminates in a point, the band being provided with an elongated slot, the rod being pivoted to the inner face of the band and projecting through the slot.

FRANK L. HOMSTEAD.
WILSON R. HOMSTEAD.